United States Patent
Kerek

(10) Patent No.: US 7,398,053 B2
(45) Date of Patent: Jul. 8, 2008

(54) METHOD AND APPARATUS FOR STABILITY MARGIN DETERMINATION IN A REPEATER

(75) Inventor: Daniel Kerek, Danderyd (SE)

(73) Assignee: Allgon AB, Akersberga (SE)

( * ) Notice: Subject to any disclaimer, the term of this patent is extended or adjusted under 35 U.S.C. 154(b) by 561 days.

(21) Appl. No.: 10/769,764

(22) Filed: Feb. 3, 2004

(65) Prior Publication Data

US 2004/0209568 A1   Oct. 21, 2004

Related U.S. Application Data

(62) Division of application No. 09/542,951, filed on Apr. 4, 2000, now Pat. No. 6,745,007.

(30) Foreign Application Priority Data

Jun. 11, 1999   (SE)   ................................. 9902212-1

(51) Int. Cl.
*H04B 7/14* (2006.01)
(52) U.S. Cl. ........................ 455/20; 455/11.1; 455/13.1
(58) Field of Classification Search ............... 455/7–10, 455/18, 67.1, 11.1, 13.1, 127.1, 127.2
See application file for complete search history.

(56) References Cited

U.S. PATENT DOCUMENTS

| | | | |
|---|---|---|---|
| 4,317,217 A | 2/1982 | Davidson et al. | 455/24 |
| 4,383,331 A | 5/1983 | Davidson | 455/24 |
| 4,562,436 A * | 12/1985 | Coleman et al. | 340/825 |
| 4,776,032 A | 10/1988 | Odate et al. | 455/24 |
| 5,095,528 A | 3/1992 | Leslie et al. | 455/10 |
| 5,115,514 A | 5/1992 | Leslie | 455/9 |
| 5,455,968 A * | 10/1995 | Pham | 455/127.2 |
| 5,802,452 A * | 9/1998 | Grandfield et al. | 455/20 |
| 5,812,933 A * | 9/1998 | Niki | 455/16 |
| 5,835,848 A * | 11/1998 | Bi et al. | 455/24 |
| 5,930,682 A * | 7/1999 | Schwartz et al. | 455/14 |
| 6,009,324 A * | 12/1999 | Pravitz et al. | 455/423 |
| 6,259,682 B1 * | 7/2001 | Brown et al. | 370/311 |
| 6,459,881 B1 * | 10/2002 | Hoder et al. | 455/11.1 |
| 6,466,766 B1 * | 10/2002 | Treatch | 455/20 |
| 6,469,984 B1 * | 10/2002 | Baker | 370/232 |
| 6,731,904 B1 * | 5/2004 | Judd | 455/11.1 |

FOREIGN PATENT DOCUMENTS

| | | | |
|---|---|---|---|
| EP | 0905914 A2 | | 3/1999 |
| WO | WO97/33381 | | 9/1997 |
| WO | WO 97/33381 | * | 9/1999 |

* cited by examiner

*Primary Examiner*—George Eng
*Assistant Examiner*—Khawar Iqbal
(74) *Attorney, Agent, or Firm*—Jacobson Holman PLLC

(57) ABSTRACT

A method and device for determining the stability margin of a RF repeater. The method is carried out in two steps, viz. establishing the amplification of the repeater as a function of the frequency in a frequency band, and observing the magnitude of wave-like variations in the established frequency response, this magnitude constituting a measure of the stability margin such that an increasing magnitude corresponds to a decreasing stability margin.

7 Claims, 2 Drawing Sheets

METHOD AND APPARATUS FOR STABILITY MARGIN DETERMINATION IN A REPEATER

This is a Divisional of application Ser. No. 09/542,951 filed Apr. 4, 2000 now U.S. Pat. No. 6,745,007.

FIELD OF THE INVENTION

The present invention relates to a method and apparatus for determining the stability margin, with respect to a possible self-oscillation, in a radio frequency repeater operating with a predetermined delay between an input and an output and having a feedback path between said output and said input. The invention also relates to a repeater system provided with such an apparatus.

Primarily, the invention concerns repeaters for use in cellular telecommunication systems, including two antennas and two sets of amplifier chains for amplifying a signal from a base station (down-link) and a signal from a cellular mobile telephone (up-link), respectively. In such a system, the repeater receives, amplifies and retransmits signals between the base station and the mobile telephone in both directions. However, the invention can be applied also to repeaters with only one signal path.

More particularly, the invention deals with the problem of ensuring that the repeater does not reach a state of instability because of self-oscillation, which may happen when the gain becomes too high. Because of the inevitable feed back between the output and the input, the too strongly amplified output signal will be transferred back to the input and will be amplified over again so as to cause a self-oscillation in the system.

BACKGROUND OF THE INVENTION—PRIOR ART

The problem of preventing self-oscillation and securing a sufficient margin to such an instability in repeaters is well-known to those skilled in the art. Normally, in order to solve this problem, the input or output signal level (or power level) is monitored during operation of the repeater.

One way, see U.S. Pat. No. 5,095,528 (Leslie), is to continuously measure the average output power of the repeater and to determine whether this power level exceeds a predetermined threshold value, in which case the amplifier gain of the repeater is drastically reduced so as to restore a stable state of operation.

Another way, which is especially useful in GSM systems operating with time slots, see WO 97/33381 (Allgon), is to measure the time proportion during which the power level of an input signal exceeds a certain threshold value, whereupon the amplifier gain is reduced in case this time proportion is relatively large, such as 90% or even larger. This method may be combined with a test whether the difference between the maximum and minimum values of the input signal level is less than a given value.

However, in both these known methods, it is necessary to adjust the gain rather drastically in response to a detected rise of the signal level. Basically, this is because the criteria being used are met only when a state of instability is reached. Thus, in the known systems, it is not possible to determine the stability margin as such. Therefore, it is difficult to provide a smooth control of the amplifier gain of the repeater.

SUMMARY OF THE INVENTION

Against this background, a main object of the present invention is to provide a method and an apparatus for determining the stability margin, with respect to a possible self-oscillation, in a repeater of the kind discussed above.

Another object is to provide a method which would enable a smooth control of the repeater without drastic changes of the amplifier gain. Accordingly, it should be possible to establish whether the stability margin is increasing or decreasing.

These and other objects are achieved, according to the present invention, by taking two basic steps, viz.

establishing the amplification of the repeater as a function of the frequency in a frequency band (which should be relatively wide), and determining the magnitude of harmonic variations in the established amplication as a function of the frequency, this magnitude constituting a measure of the stability margin in that an increasing magnitude corresponds to a decreasing stability margin.

In this way, it is possible to obtain a measure of the stability margin even when the system operates normally and is still stable. Consequently, any control measures can be taken already long before the system approaches a state of instability, and the control can therefore be performed smoothly, i.e. with relatively small adjustments of the amplifier gain of the system.

When using an appropriate control algorithm, the system can be retained in a stable state without self-oscillation.

The method can be carried out by means of a measurement receiver connected to the output and possibly also to the input of the repeater by means of a directional coupler, preferably via a switch alternating between the input and the output.

Advantageously, in order to establish the amplification or frequency response in the particular frequency band, provided that the spectral properties of the input signal are known, it is sufficient to measure the output signal as a function of the frequency. Then, the frequency response and the stability margin can be calculated.

The invention will be explained further below with reference to the appended drawings illustrating a repeater and a measurement receiver for determining the stability margin in accordance with the invention.

DETAILED DESCRIPTION OF A PREFERRED EMBODIMENT

Figure 1:
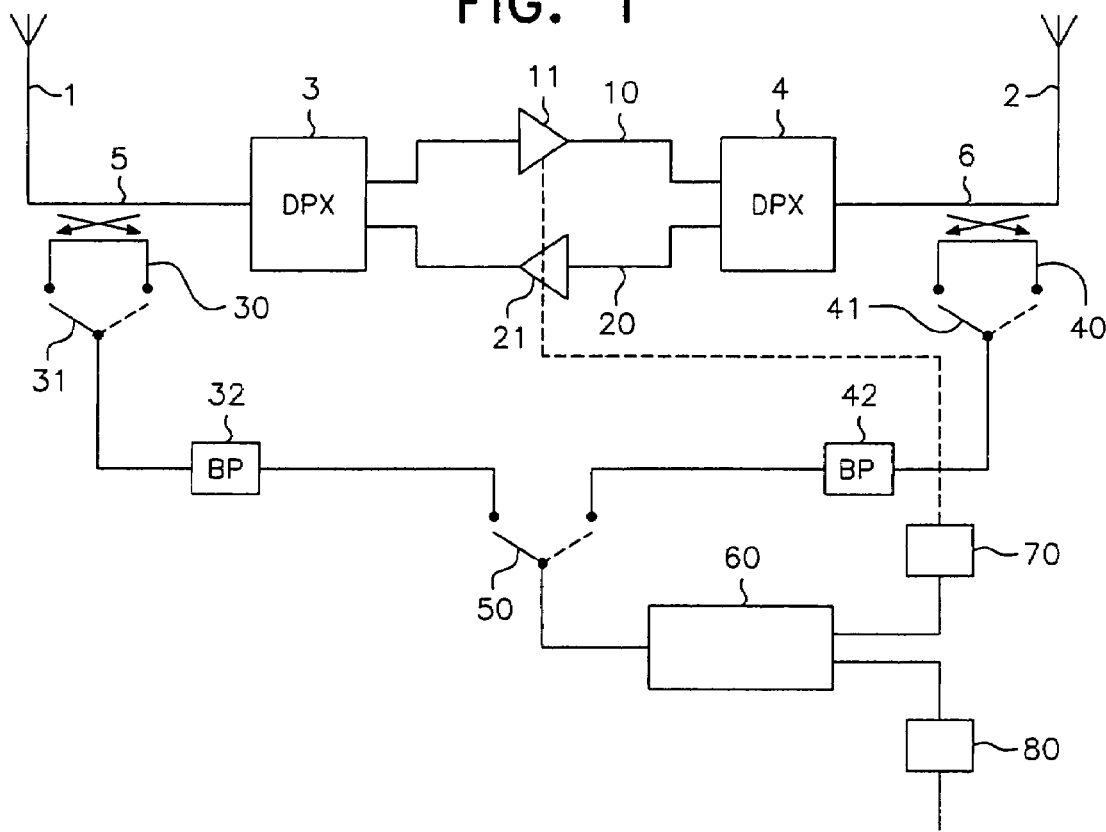
FIG. 1 illustrates schematically a repeater for use in a cellular telephone system, and associated apparatus for measuring the stability margin of the system.

The repeater illustrated in FIG. 1 is of the kind generally used in cellular telephone systems, e.g as described in the above-mentioned document WO97/33381, including a first antenna 1 for radio communication between the repeater and a cellular mobile telephone (not shown) and a second antenna 2 for a corresponding radio communication between the repeater and a base station (not shown).

The first and second antennas 1,2 are connected via duplex filters 3,4 to two oppositely directed links, namely an uplink 10 for transferring signals originating from mobile telephones towards the associated base station, serving the cell in which the repeater and the mobile telephone are located, and a downlink 20 for transferring signals in the opposite direction. Each link includes a number of mutually parallel amplifier chains, each such chain handling a specific frequency or frequency band. In FIG. 1, the amplifiers in these chains are represented by an amplifier 11 in the uplink 10 and an amplifier 21 in the downlink 20.

In the transmission lines 5,6 connecting the respective antenna 1,2 and the respective duplex filter 3,4, directional couplers 30 and 40 are disposed so as to enable the sensing of signals in the respective transmission line segment 5,6. The sensed signals are fed via switches 31,41 and band pass filters 32,42 to a common switch 50 connected to a measurement receiver 60. In the measurement receiver 60, the particular signal is analysed, so that the signal level as a function of the frequency in the particular frequency band is obtained.

It will be appreciated that the directional couplers and switches are connected in such a way that any input or output signal in the respective transmission line 5,6 (the input or output of the system) can be analysed.

Figure 2:
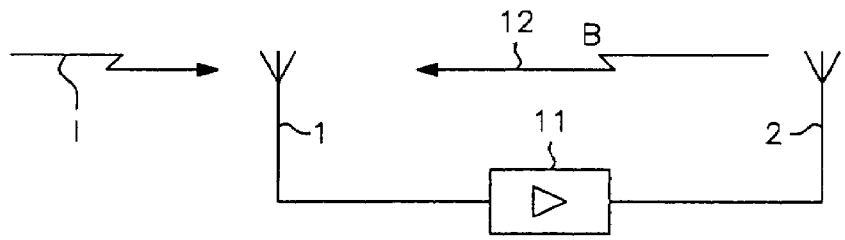
FIGS. 2 and 3 are schematic representations of the repeater and the associated antennas as a simple feed back amplifier system.
Figure 3:
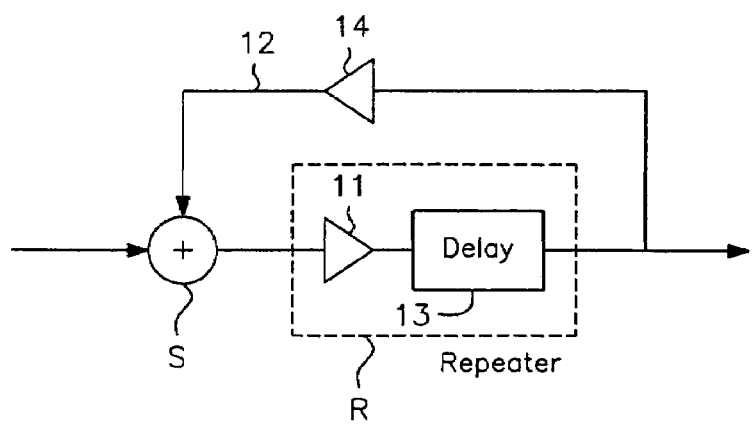

The inventive concept is based on a simplified model of the repeater as represented in FIGS. 2 and 3. An input RF signal I (from a mobile telephone, not shown) is propagated on a microwave carrier wave in the air and hits the first antenna 1 in FIG. 2, whereupon the signal is transferred through the uplink, represented by the amplifier 11, to the second antenna 2. Inevitably, a (normally very small) portion B of the signal is fed back through the air, represented by a leakage path 12. In FIG. 3, the repeater R and the two antennas 1,2 are represented as a schematic, standardized control system with a summation element S, a main amplifier 11, a delay element 13 and a feed back loop 12 corresponding to the leakage path between the two antennas. The delay element corresponds to the inevitable delay occuring in filters and other components normally included in the amplifier chains of a repeater of the kind indicated above.

Because of the delay element 13, the effective amplification of the system of FIG. 3 will depend on the frequency. As can be shown by a Laplace-transform representation of the system, using the frequency domain rather than the time domain, the ratio between the output and input signals (or the transfer function as it is normally denoted in control theory) in the system of FIG. 3 can be represented as $$\frac{g1e^{-ds}}{1-g1g2e^{-ds}}$$

where g1 is the gain of the amplifier 11, g2 is the gain in the (schematic) amplifier 14 in the feedback loop 12 and d is the delay in the delay element 13. From this formula, it is clear that the amplification is a harmonic function of the frequency.

Figure 4:
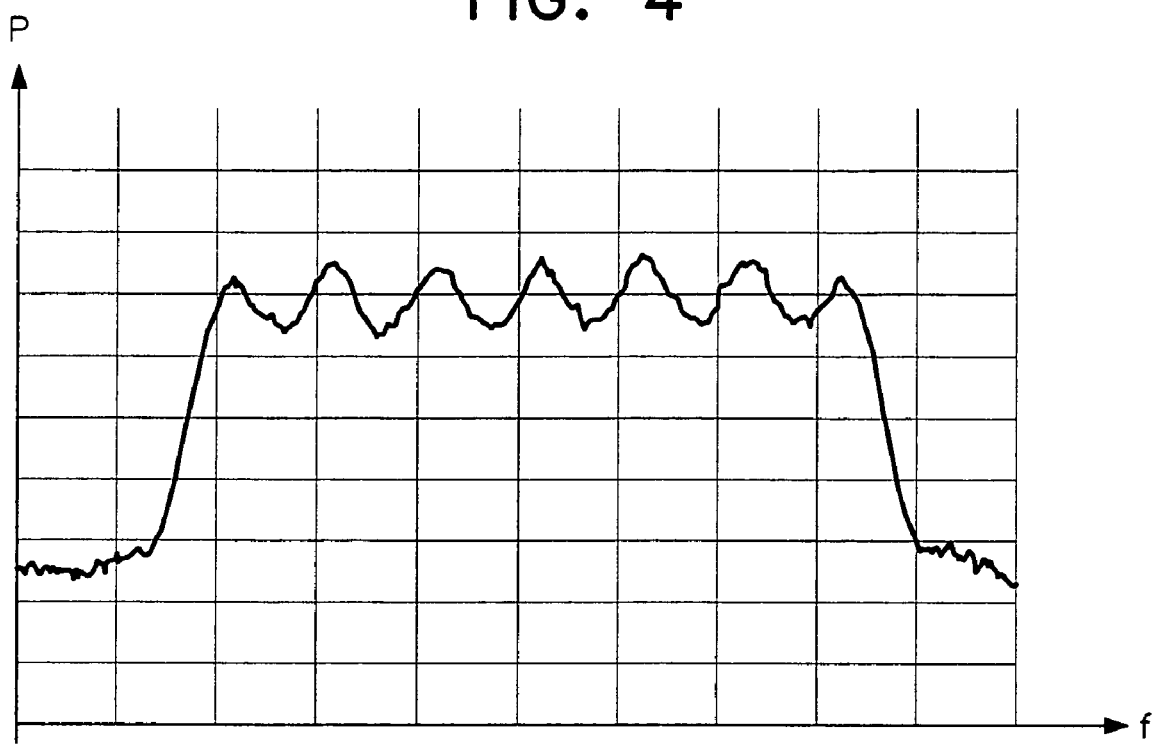
FIG. 4 is a diagram representing the output power as a function of the frequency in a frequency band.

A frequency response diagram of the output power of signal in a receiver is shown in FIG. 4. The curve shows a pattern of harmonic variations of the power P as a function of the frequency f. It has been verified, by practical measurements, that the magnitude of such variations is a measure, though in an inverse relation, of the stability margin. Thus, when the magnitude of the variations, e.g. the peak-to-peak value, decreases, the stability margin will increase and vice versa.

Figure 5:
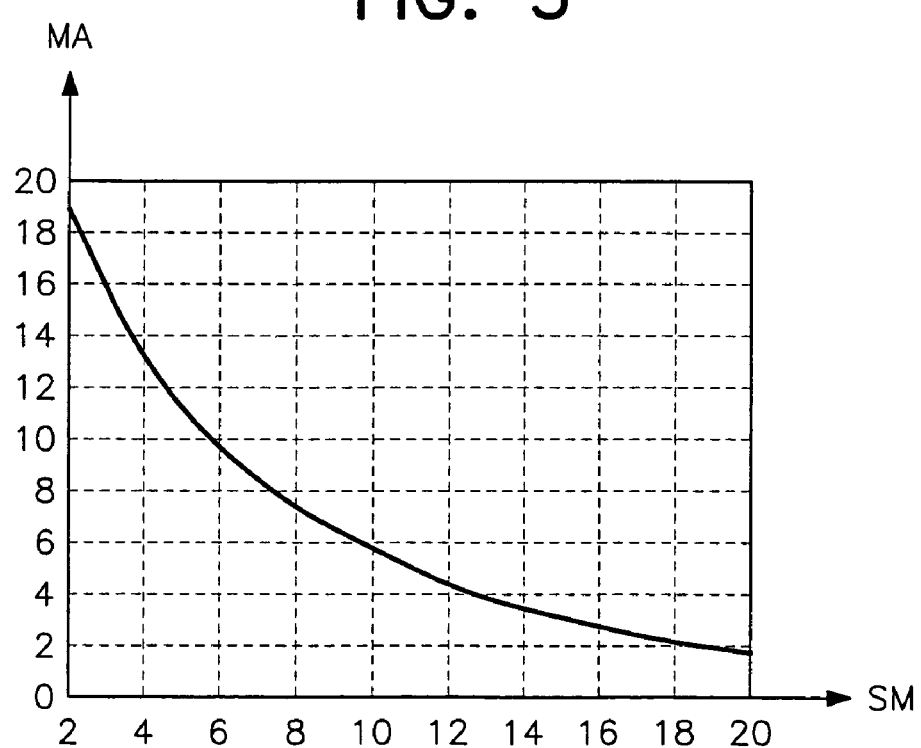
FIG. 5 is a diagram representing the magnitude of the peak-to-peak variations (of the power or amplification shown in FIG. 4) as a function of the stability margin of the repeater.

FIG. 5 illustrates the relation between the isolation or stability margine SM (horisontal axis or abscissa in dB) and the peak-to-peak value or magnitude MA of the amplification variations (vertical axis or ordinata in dB).

Accordingly, by using the apparatus shown in FIG. 1, it is possible to establish a functional relationship between the input and output signals and to calculate the stability margin, with respect to a possible self-oscillation, by way of the functional relation illustrated in FIG. 5.

When the spectral properties of the input signal are known beforehand, it is sufficient to measure the output power level P as a function of the frequency f, as illustrated in FIG. 4.

Of course, the measured value of the magnitude of the harmonic variations can form the basis of a control signal controlling the gain of the repeater, so as to keep the stability margin substantially constant at a desired level. For this purpose, the measurement receiver 60 may be connected to a control unit 70 adapted to implement such a control. If desired, the measurement and control can be initiated remotely, e.g. from an operation and monitoring centre (not shown) via a telephone modem 80 or some other telecommunication link.

The invention claimed is:

1. An apparatus for determining a stability margin (SM) with respect to a possible self-oscillation in a radio frequency repeater receiving, amplifying and retransmitting radio frequency signals between an input and an output, and operating with a predetermined delay between the input and the output, and having a feedback path between said output and said input, said apparatus comprising at least one sensing element connected to at least said output of the repeater, at least one measurement receiver connected to said at least one sensing element for measuring at least an output signal from said repeater, on the basis of which the stability margin is calculated, said sensing element establishing an amplification of the repeater as a function of the radio frequency in a frequency band, and means for producing a magnitude (MA) of harmonic variations in a signal level for various frequencies measured by the at least one measurement receiver constituting a measure of the stability margin in that an increase of the magnitude of the harmonic variations corresponds to a decrease of the stability margin and vice versa.

2. The apparatus as defined in claim 1, wherein said at least one sensing element comprises at least one directional coupler.

3. The apparatus as defined in claim 2, wherein two directional couplers are connected to a single measurement receiver via a switch for alternating measurement of the signals at the output and the input, respectively.

4. The apparatus as defined in claim 1, wherein said measurement receiver is connected to a control unit for controlling the gain of said repeater.

5. The apparatus as defined in claim 1, wherein said measurement receiver is connectable, via a modem, to a central operational monitoring unit so that the measurements are made by remote control.

6. The apparatus as defined in claim 1, wherein a band pass filter is inserted between said sensing element and said measurement receiver.

7. A repeater system, including a radio frequency repeater having two antennas and two links there between, said two links comprising an uplink for amplifying signals from a mobile telephone to a base station and a downlink for amplifying signals from said base station to said mobile telephone, said repeater system being provided with an apparatus as defined in claim 1.

* * * * *